United States Patent [19]
Maier

[11] 4,034,371
[45] July 5, 1977

[54] APPARATUS AND METHODS FOR DIFFERENTIATING BETWEEN SYNCHRONOUS AND ASYNCHRONOUS RESPONSE SIGNALS IN SECONDARY RADAR DEVICES

[75] Inventor: Bruno Maier, Munich, Germany

[73] Assignee: Siemens Aktiengesellschaft, Berlin & Munich, Germany

[22] Filed: Apr. 28, 1975

[21] Appl. No.: 572,519

Related U.S. Application Data

[63] Continuation-in-part of Ser. No. 461,741, April 17, 1974, abandoned.

[30] Foreign Application Priority Data

May 21, 1973 Germany .......................... 2325617

[52] U.S. Cl. ..................... 343/6 R; 343/6.5 LC; 343/17.1 PF
[51] Int. Cl.² .......................................... G01S 9/56
[58] Field of Search .......... 343/6 R, 6.5 R, 6.5 LC, 343/17.1 PF

[56] References Cited
UNITED STATES PATENTS
3,755,811  8/1973  Breckman ....................... 343/6.5 R

*Primary Examiner*—T.H. Tubbesing
*Attorney, Agent, or Firm*—Hill, Gross, Simpson, Van Santen, Steadman, Chiara & Simpson

[57] ABSTRACT

Apparatus and method for differentiating between desired synchronous signals and undesired asynchronous response signals in a plurality of secondary radar devices, wherein the interrogation signals are obtained by frequency division from the pulse repetition transmitted rate of the associated primary radar devices which have a pulse repetition rate which is identical or similar to each other and which systems have interference blanking devices to suppress synchronous response signals on the basis of different interrogation pulse repetition rates.

5 Claims, 10 Drawing Figures

APPARATUS AND METHODS FOR DIFFERENTIATING BETWEEN SYNCHRONOUS AND ASYNCHRONOUS RESPONSE SIGNALS IN SECONDARY RADAR DEVICES

CROSS-REFERENCE TO RELATED APPLICATION

This application is a continuation in part of my application entitled "Apparatus and Methods for Differentiating Between Synchronous and Asynchronous Response Signals in Secondary Radar Devices" filed Apr. 17, 1974, Ser. Num. 461,741, now abandoned

BACKGROUND OF THE INVENTION

1. Field of the Invention

This invention relates in general to secondary radar devices and in particular to means for distinguishing between desired and undesired response signals.

2. Description of the Prior Art

Prior art systems are known in which secondary radar devices are confused by signals from other secondary radar devices which give rise to the so-called fruit interference. For example, the book entitled *Sekundar-Radar*, in Chapter 1, point 7, pages 54-61, by Honold, discloses the cause of and method of eliminating such interference.

The publication "Journal of the British IRE" 16, (1956), pages 355–382 states at page 373 that the pulse repetition rate in secondary radar devices may be obtained from the pulse repetition rate of an associated primary radar device.

The publication "Electronic Engineering" 33, (1961), pages 414–420 states at page 420 that fruit interference can occur when the interrogation pulse repetition rates of neighboring secondary radar devices are the same. This article states that a possible remedy to this problem is to change the interrogation pulse repetition rate of one of the secondary radar devices. There is a disadvantage to this, however, in that when a large area is densely covered by numerous secondary radar interrogation devices there is the danger that the interference will occur in respect to a different pair of secondary radar devices. A further disadvantage consists in the fact that the possibilities of altering the interrogation pulse repetition rate are limited.

SUMMARY OF THE INVENTION

An object of this invention is to provide, with minimum cost, a system in which asynchronous response signals or response signals triggered by other interrogation stations are suppressed and at the same time to provide a system in which the correct correlation of primary radar and secondary radar signals from the same target is achieved at low cost.

The invention consists in a system for differentiating between desired (synchronous) and undesired (asynchronous) response signals in a plurality of secondary radar devices wherein the interrogation signals are obtained by means of frequency division from the transmitted pulse repetition rate of associated primary radar devices having an identical or similar pulse repetition rate to each other, and use interference blanking devices which suppress asynchronous response signals on the basis of different interrogation pulse repetition rates and where the divider ratios for the frequency division in the individual secondary radar devices are constantly varied in a time-dependent fashion. The time sequence in which the divider ratios are varied differs for neighboring secondary radar devices which may cause interference between each other. The divider ratios are always integral; and the time sequence of the change in the divider ratios is constantly transmitted to the relevant receiver of the response signals, where it is used to analyze the response signals in the interference blanking devices.

An expensive and complex analysis of the responses is thus unnecessary because in spite of the constant changes in the divider ratio, each response signal remains correctly assigned, in terms of time, to the relevant primary radar echo signal and always has the same position in relation to the primary radar echo signal for a specific target. Consequently the correct assignment of the secondary radar response signals to the relevant primary radar echo signals is automatically achieved and does not involve additional expenditure. Even in the case of a low overall variation range for the divider ratios, it is possible for a plurality of neighboring secondary radar devices to operate without the presence of response signals incorrectly considered to by synchronous, since arbitrary time programs can be established for the time sequence of the divider ratios.

A further advantage of a system in accordance with the invention is that the response devices (during the processing time) are blocked at different points of time so that other interrogation stations can initiate to response signal in the same response device, at least periodically. This may not be the case in synchronous or approximately synchronous interrogations by different interrogation stations.

The assignment to the echo signal of the primary radar device is of particular significance in cases in which range correlation is to be carried out with the assistance of one or a plurality of range gates (e.g. in target-following radar). The system does not require that any additional measures to be taken in order to achieve the correct assignment to the primary radar echo signal which usually produces an impairment of the range resolution due to the necessary delay devices (e.g. as a result of quantizing).

A preferred solution for varying the divider ratio is to cause the change in the divider ratio to be carried out statistically or approximately statistically. Even when only very small variation ranges of the divider ratio are possible, this provides the opportunity of protecting a large number of secondary radar devices from asynchronous or incorrectly "synchronous" interferences.

In the case of a smaller density of secondary radar devices it may however be possible to provide simple but in each case different periodic processes for the divider ratios of neighboring secondary radar devices.

It is expedient for the range over which the divider ratios are varied to be maintained the same for all secondary radar devices.

It is particularly advantageous if the divider ratios are arranged symmetrially about the maximum permissible divider ratio. The "maximum permissible" divider ratio is governed by international agreements and (indirectly) provides an upper limit for the interrogation repetition frequency which must be maintained within a large period of time. In the event of a statistical overshooting or undershooting of the maximum permissible value, on the average the value will be maintained. The number of possible divider ratios will however be considerably greater than known constant divider ratios and thus the possibilities of eliminating undesired response signals are substantially improved.

It is expedient that the number of possible divider ratios should be selected to be no greater than the average number of responses which a target can provide at the constant maximum permissible interrogation frequency. Otherwise the danger exists that too few responses will be received in respect of the target sweep-over time.

It is advantageous that a change in the divider ratio be carried out in the case of each interrogation signal.

In many cases it is expedient to provide an acceptance threshold which does not permit a display until a predetermined number of consecutive synchronous responses have been received.

It is possible to enlarge the possible interrogation sequences by using the same divider ratio a plurality of times in succession, but the number of identical divider ratios should be lower than the acceptance threshold.

A secondary radar device can be provided with a random generator which controls the sequence of the divider ratios directly or indirectly.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1A:
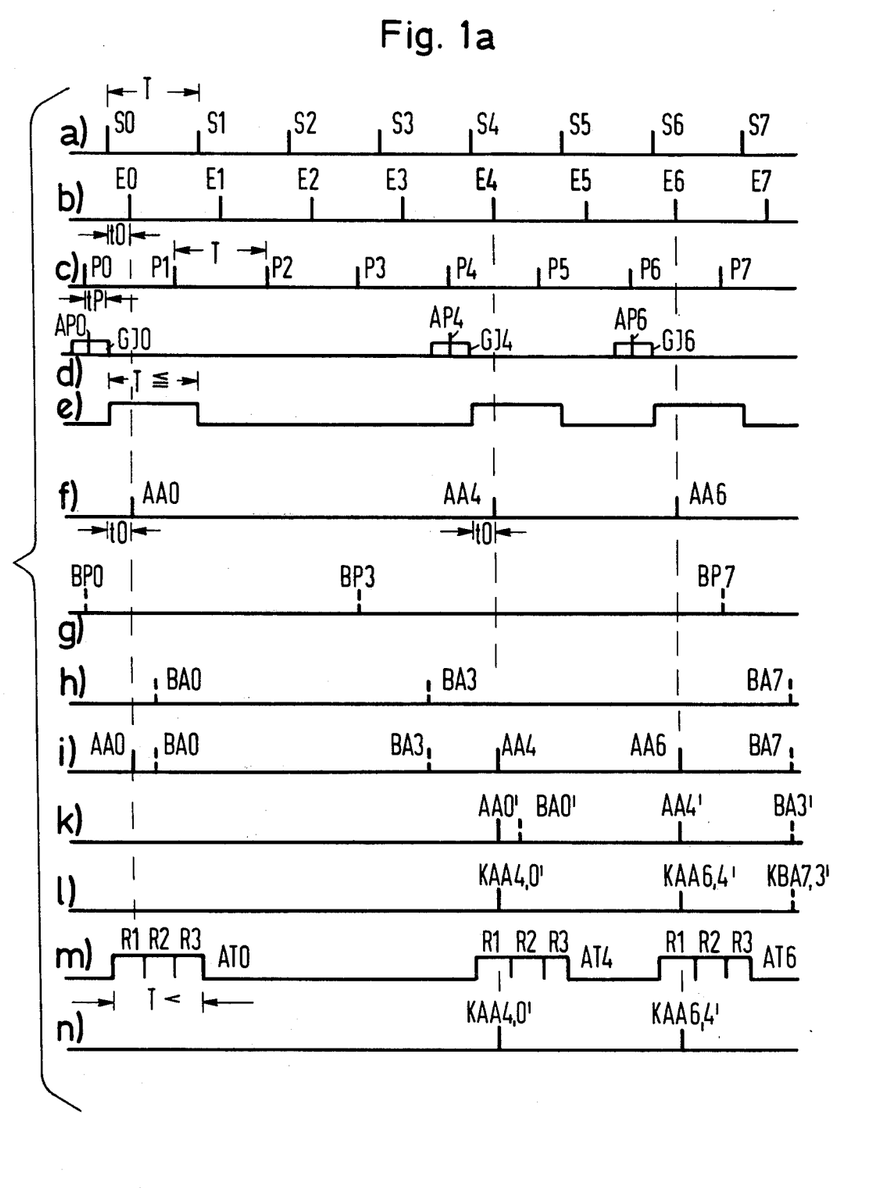
FIGS. 1a and 1b are left and right portions of a drawing illustrating wave shapes and time relationships in radar devices according to the invention.
Figure 1B:
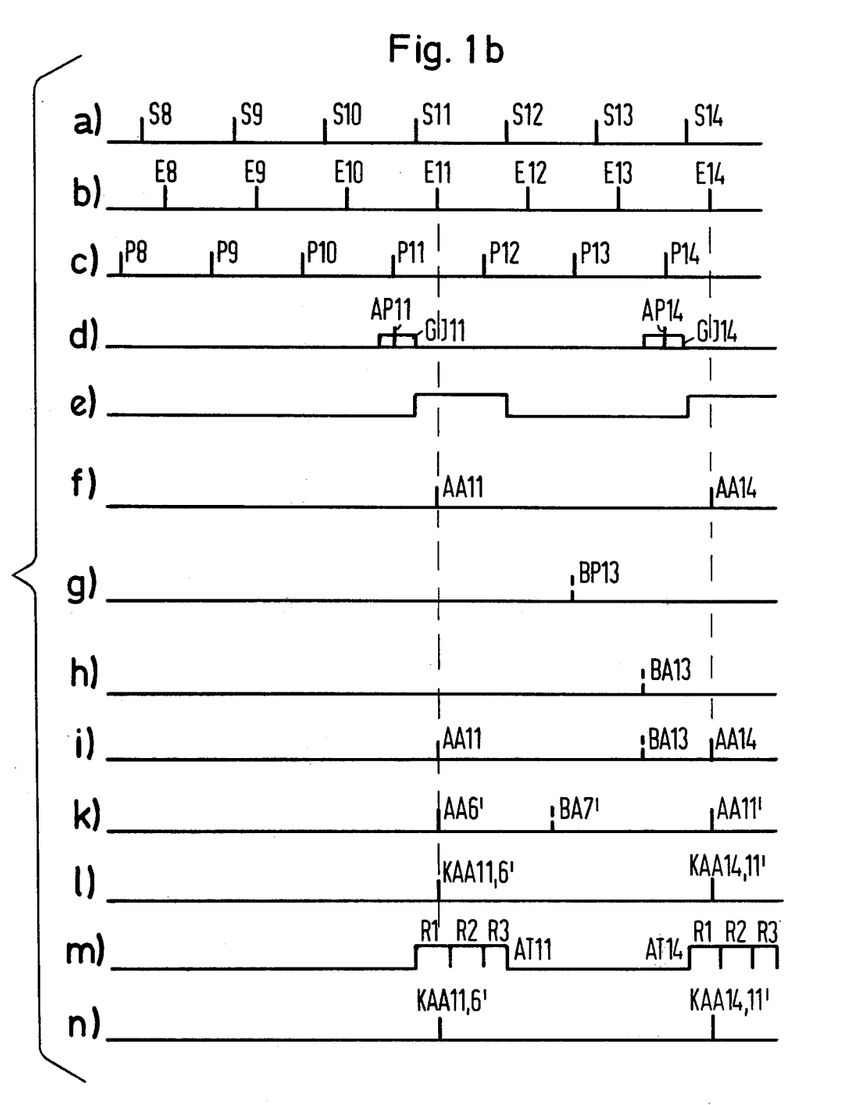

In FIGS. 1a and 1b, the following pulse sequences are represented on a time scale:

Line a. Primary radar transmitted pulses

Line b. Target echo signals from transmitted pulses in line a)

Line c. Pretrigger pulses for secondary radar devices

Line d. Varied divider ratio of a first interrogation station A (secondary radar device)

Line e. Display range for secondary radar response signals in station A

Line f. Target responses of a target as a result of interrogation by interrogation station A Line g. Varied divider ratio of an interrogation station B (secondary radar device)

Line h. Responses to interrogation of station B

Line i. Responses to interrogations of both stations A and B

Line K. Responses delayed according to the interrogation plan of station A

Line l. Response at the output of double coincidence with the signals of lines i) and k)

Line m. Display ranges (acceptance gates) of the interrogation station A

Line n. Display on the PPI screen of the interrogation station A.

In line a) the transmitted pulses of a first primary radar device are shown as pulses SO to S14. The pulse period $T=1/fp$, where fp is the pulse repetition rate of the primary radar device.

In line b) the associated echo signals of a target at a specific range are shown as pulses EO to E14, where the echo signal EO relates to the transmitted pulse SO, the echo signal E1 relates to the transmitted pule S1 and so on. The transit time for the echo signal thus amounts to $t^0$, from which in a known manner the target range can be determined and a corresponding representation can be made as on a PPI screen.

In line c) the pretrigger pulses are shown as pulses to P14. In radar devices in which the screen of the primary radar device is to simultaneously reproduce the information from a secondary radar device, pretrigger pulses are employed in a known manner. The processing of the secondary radar information in the response device and possibly also in the interrogation device requires a longer time than the processing of the information in the primary radar device, so that the secondary radar interrogations have been transmitted at a predetermined time tP (pretrigger time) which is governed by the system, prior to the transmission of the associated primary radar transmitted pulse. Thus, with no additional outlay, an approximately location-correct representation on the screen, of the primary radar and secondary radar information of a target is ensured. The pretrigger pulses have the same distribution as the transmitted pulses SO to S14 in line a) except that they precede the transmitted pulses by the time tP.

In radar devices which effect a different type of representation or processing of the primary radar and secondary radar information (e.g. by means of computers) it may not be necessary to generate special pretrigger pulses. In this case the interrogation pulses for the secondary radar device can be obtained directly from the primary radar pulses by means of frequency division. The following considerations based on pretrigger pulses would then apply as applicable to the transmitted pulses.

Line d) represents the interrogation signals (normally consisting of a plurality of pulses) for a first interrogation station A, in a schematic representation employing no fixed divider ratio but a variable divider ratio in relation to the pretrigger pulses shown in line c). The first interrogation pulse AP0 is associated with the pretrigger pulse P0 (and thus indirectly to the transmitted pulse S0). The second interrogation pulse AP4 relates to the pretrigger pulse P4 (and thus indirectly to be transmitted pulse S4). The divider ratio for the first two interrogation pulses AP0 and AP4 in relation to the transmitted pulses and pretrigger pulses would thus be 1 : 4.

The next interrogation pulse AP6 which follows the interrogation pulse AP4 is obtained from the pretrigger pulse P6 and thus the transmitted pulse S6. The divider ratio would thus be 1 : 2 for the two interrogation pulses AP4 and AP6 in relation to the transmitted pulses and pretrigger pulses.

The next interrogation pulse AP11 to follow the interrogation pulse AP6 is obtained from the pretrigger pulse P11 and thus the transmitted pulse S11. Thus, the divider ratio for the two interrogation pulses AP6 and AP11 in relation to the transmitted pulses and pretrigger pulses would be 1 : 5.

The next interrogation pulse AP14 which follows the interrogation pulse AP11 is obtained from the pretrigger pulse P14 and thus from the transmitted pulse S14. The divider ratio for the two interrogation pulses AP11 and AP14 in relation to the transmitted pulses and pretrigger pulses would thus be 1 : 3.

The time sequence manner in which the divider ratios are varied thus runs from one to another interrogational pulse in station A in the sequence ratios 1:4, 1:2, 1:5, 1:3. This sequence can be continued in an arbitrary, statistical or pseudostatistial fashion.

Line e) shows the display range for secondary radar targets in station A. The display range is at the maximum equal to the pulse duration T of the primary radar device. It commences immediately following the transmission of the relevant primary radar transmitted pulse and ends before the transmission of the next primary radar transmitted pulse. The secondary radar device is thus always available for a specific length of time following the transmission of the transmitted pulses S0, S4, S6, S11 and S14.

Line f) represents the response signals to the interrogations of station A in accordance with line d). Here it is assumed that the signals come from the same target which originates the echo signals E0 to E14 in the primary radar device. Due to the preliminary distortion correction in respect of time (by the pretrigger pulses), these response signals follow the associated transmitted pulse from which the interrogation signal was derived, at the same time interval $t^0$ as the passive echo signals E0, E4, E6, E11, E14 and can thus be reproduced on a screen together with the latter in the correct position. These response signals are referenced AA0 (triggered by AP0), AA4 (triggered by AP4), AA6 (triggered by AP6), AA11 (triggered by AP11), and AA14 (triggered by AP14). The control of the display range (acceptance gate) of the secondary radar device must, accordingly, be accomplished in time-dependent fashion in the same sequence as the sequence of the interrogation pulses in line d). It is then ensured that a corresponding section of asynchronous response signals are already singled out as a result of the special nature of the opening of the display range in accordance with line e).

Line g) shows the interrogation signals of a second station B, which signals have been assumed to be obtained from a secondary radar device which has the same primary radar pulse train as the interrogation signals from station A in line d). Thus in this case a situation has been assumed to exist which is unfavorable for interference suppression and in which both secondary radar stations A and B cooperate with primary radar devices which have the same pulse repetition rate and the same phase state. The first interrogation pulse BP0 relates to the pretrigger pulse P0 and the transmitted pulse S0, the interrogation pulse BP3 relates to the pretrigger pulse P3 and the transmitted pulse S3, the interrogation pulse BP7 relates to the pretrigger pulse P7 and the transmitted pulse S7, and the interrogation pulse BP13 relates to the pretrigger pulse P13 and the transmitted pulse S13. The divider ratio, based on the interrogation pulse BP0 will thus vary in station B in accordance with the ratios 1:3, 1:4, 1:6. This time sequence of the divider ratios differs from the sequence of the divider ratios in interrogation station A as shown in line d).

Response signals from targets which are triggered by interrogation station B are represented in line h). The response signal BA0 is obtained from interrogation signal BP0, the response signal BA3 from interrogation signal BP3, the response signal BA7 from interrogation signal BP7 and the response signal BA13 from interrogation signal BP13. Thus -apart from a time shift- these response signals have the same distribution as the interrogation signals in line g).

Line i) shows the response signals with lines f) and h) in common. Such responses can arrive, for example, at the interrogation station A, in which case the responses AA0, AA4, AA6, AA11, and AA14 represent desired response signals and the responses BA0, BA3, BA7, BA13 represent undesired response signals (because they are triggered by the interrogation station B).

In spite of the very high density of undesired response signals, it is possible to distinguish the synchronous from the asynchronous signals in any of the stations. This is to be explained relative to station A with the aid of the following lines k) to n). As it is assumed that in the receiver of the relevant station the time sequence of the divider ratios or the interval with which the interrogation signals are transmitted is known, coincidence circuits may be formed which employ the coincidence (in terms of time) of consecutive interrogation signals for analysis purposes. In the case of a divider ratio of 1:4 as applied between the interrogation signal AP0 and the interrogation signal AP4 in the case of station A, when the response signal AA0 is delayed for a time 4T, coincidence with the response signal AA4 must occur.

In line k), the response signal AA0' from line i) and line f) is delayed by 4T and therefore coincides with the following response signal AA4. This results in an output signal in the case of the double coincidence in line 1) which output signal is referenced KAA4,0'. The response signal BA3 which was triggered from station B is suppressed because no corresponding response signal is stored at station A. Further details of the delay device will be explained with reference to FIG. 4.

The response signal AA4 is delayed by 2T, in accordance with the divider ratio 1:2, and as signal AA4' in line k) is compared with the response signal AA6. A coincidence signal KAA6, 4' is formed which leads to a display KAA6, 4' shown in line n). The response signal BA0', which is produced from the delay of the response signal BA0 by 4T, is suppressed.

The response signal BA3, which has been delayed by 4T, coincides with the response signal BA7 from line i) (which is an example of an undesired random coincidence). A coincidence KBA7, 3' occurs which could lead to an incorrect response display. As, however, the display range of the station A is not open on the occurrence of the coincidence pulse KBA7, 3' (no acceptance gate is contained in the corresponding position in line m), this randomly-formed faulty coincidence is likewise suppressed. The range of the acceptance gates AT0, AT4, AT6, AT11, AT14 in line m) is somewhat less than the repetition period T of the transmitted pulses. They are opened immediately following the transmission of the relevant transmitted pulse (e.g. AT0 after S0) and are closed before the following transmitted pulse (for AT0, the transmitted pulse S1). They only occur after corresponding interrogation signals (e.g. AT0 after the interrogation AP0). Thus, the acceptance gates shown in line m) also represent the distribution of the interrogations.

The response signal AA6' in line k) is delayed by 5T, in accordance with the divider ratio 1:5, and coincides with the response signal AA11 in line i). A coincidence pulse KAA11, 6' is formed since the acceptance gate of station A in line m) is open. This leads to a display KAA11, 6' in line n). The response signal BA7' which is likewise delayed by 5T is suppressed. The response signal AA11' which is delayed in accordance with the divider ratio 1:3 by 3T, in accordance with the line k) leads to a coincidence with the response signal AA14 in line i) which coincidence is represented in line l) and referenced KAA14, 11'. This also causes a display KAA14, 11' in accordance with line n). The response signal BA13 shown in line i) does not lead to a display in station A.

Similarly in the case of the interrogation station B, the responses which here are to be considered asynchronous and which are emitted by the targets as a result of interrogations by station A are suppressed. These would be the responses AA0, AA4, AA6, AA11, and AA14.

It should also be pointed out that in spite of a corresponding rule or statistical distribution of the interrogation signals, any random coincidences which may occur and which would also fall in the display range of the relevant station (e.g. of station A in line m) do not normally lead to difficulties, since usually genuine response signals are not accepted on the basis of a single coincidence. In the secondary radar devices, acceptance thresholds are provided which e.g. do not release the response signals for analysis until after a triple or quintuple coincidence. No difficulties will result in the screen analysis since the radar observer will not usually interpret one short illumination of the screen as a genuine response signal.

There are different methods in which the time sequence of the change of the divider ratios can be used in the receiver of the secondary radar device for blanking out undesired response signals. One simple possibility consists in using acceptance gates for this function. Line m) of FIGS. 1a and 1b shows that the acceptance gates of the receiver of station A have the same distribution as the interrogation signals AP0, AP4, AP6, AP11, AP14 in line d). As thus the acceptance gates AT0, AT4, etc. in line m) are controlled in a similar manner to the interrogation signals of line d), the various divider ratios and different intervals between the interrogation signals have already been taken into consideration in the receiver of the interrogation station, for purposes of analysis.

A further improvement in this analysis and thus a better suppression of undesired response signals can be made by splitting up each acceptance gate into individual range channels. In line m) three such range channels R1, R2, and R3 have been indicated in each acceptance gate. These range channels are usually selected to be of the same size; in most cases however there will be a number larger than three.

It will be seen that the desired response signals, as in the case of station A, the response signals AA0, AA4, AA6, AA11, AA14 always fall into the same range channel R1. When undesired response signals are also by chance present following the acceptance gate circuit (e.g. as a result of the interrogation of station B) in a manner not shown in detail this requirement is not fulfilled. These response signals will in fact fall, for example, once into the range channel R1, however, the next interrogation will not fall into the acceptance gate at all, and the next interrogation will fall into the range channel R3 and so on. Thus, there will be a statistical distribution among the range channels so that display can be prevented by introducing a corresponding counter threshold. If e.g. one assumes that the acceptance threshold (counter threshold) is selected to be such that prior to a display three responses must occur in succession in the same range channel, a corresponding acceptance threshold in the form of a counter circuit will permit display to take place only on the basis of the response signal AA6 since this would be the third response signal in the range channel R1 (after AA0, AA4).

Figure 2:
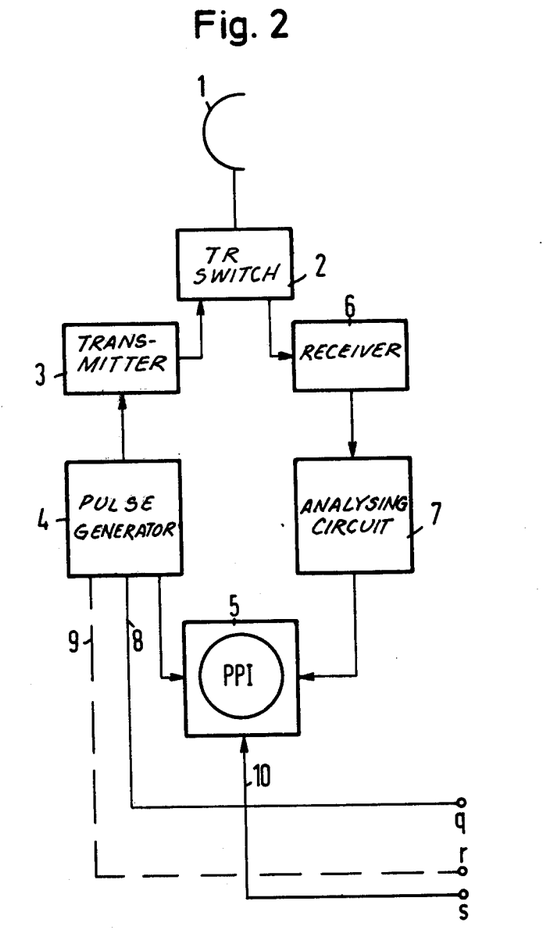
FIG. 2 is a block circuit diagram of a primary radar device.

FIG. 2 is a block circuit diagram of the primary radar device of an interrogation station, comprising an antenna 1 connected to a transmitting/receiving switch 2. A transmitting section 3 is connected to switch 2, and a pulse central control 4 (e.g. a pulse generator) is connected to the transmitter. A display or analysis device e.g. a screen 5 receives an input from generator 4. The receiving branch comprises a receiving section 6 connected to switch 2. An analysis circuit 7 is connected to receiver 6 and supplies an input to display 5. The pulse central control 4 determines the pulse repetition rate fp of the primary radar device by the keying of the transmitter 3, and controls the production of the transmitted pulses S0 to S14 shown in line a) in FIG. 1. The deflecting beam of the screen 5 is also controlled by the pulse central control unit 4 in a known manner. Lines 8 and 9 lead from the pulse central control unit 4 to a secondary radar device shown in FIG. 3 so that the two devices are linked by a pulse train. A line connection 10 from the secondary radar device, also shown in FIG. 3, serves to transmit information obtained from response signals to the screen 5. The terminals q for the line 8, r for the line 9 and s for the line 10 are shown in both FIGS. 2 and 3, which are the two halves of a single block diagram. Actually these are continuous line links, normally in the form of a plurality of wires.

Figure 3:
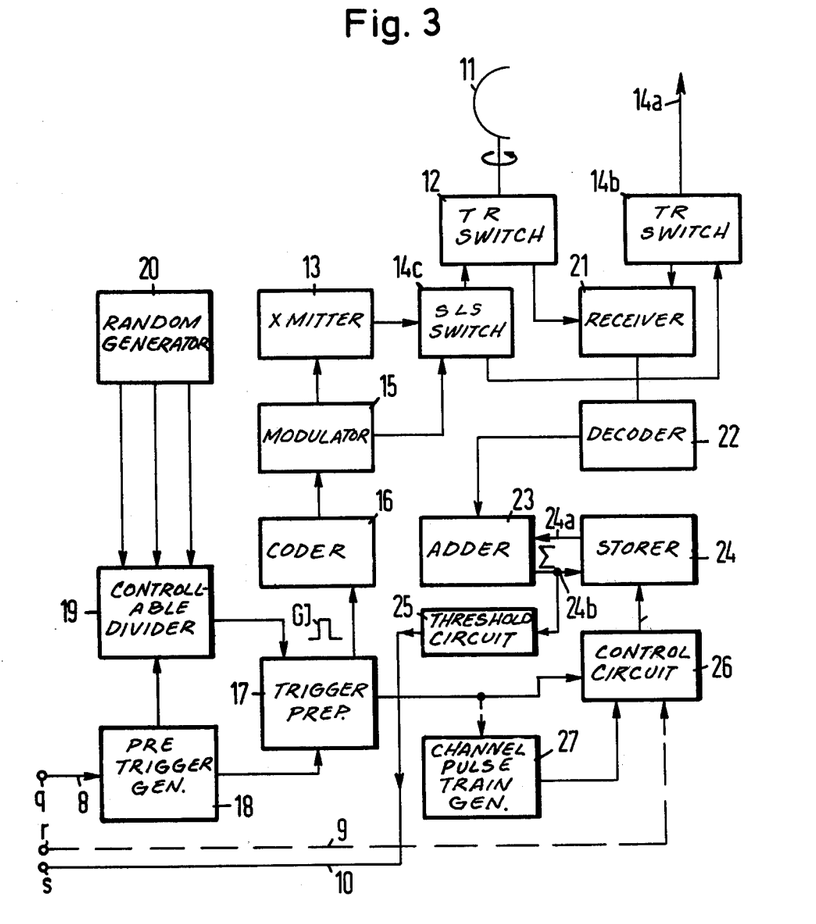
FIG. 3 is a block circuit diagram of an associated secondary radar device.

The secondary radar device shown in FIG. 3 comprises a transmitting/receiving antenna 11 connected to a transmitting/receiving switch 12. A transmitter 13 is connected to SLS switch 14c. A device for secondary lobe suppression (SLS) comprises an omnidirectional antenna 14a, a transmitting/receiving switch 14b and the SLS switch 14c The secondary radar also comprises a modular 15 connected to transmitter 13 and SLS switch 14c. A coder 16 is connected to modulator 15. A circuit for trigger preparation 17 is connected to coder 16 and a circuit for pretrigger generation 18 is connected to circuit 17. Furthermore at the transmitting end there is arranged a controllable divider circuit 19 which is connected to a statistical or pseudostatistical random generator 20, the trigger preparation circuit 17 and pretrigger generator 18.

The receiving section comprises a receiver circuit 21 connected to TR switches 12 and 14b. A decoder 22 is connected to receiver 21 and to an adder stage 23. A storer 24 e.g. in the form of one or a plurality of shift registers in connected to a threshold value circuit 25 and to adder 23. A control circuit 26 is connected to the storer 24, and a circuit 27 for the generation of the channel pulse trains for the range channels is connected to the control circuit 26.

The parts of the arrangement which are well-known in secondary radar devices will not be described in detail, but the manner of suppressing undesired response signals by means of the interference blanking device will be describedin detail.

The pretrigger pulses P0 to P14 in line c) of FIG. 1 are formed by the circuit 18 from the pulses supplied by the pulse central control 4. These are in practice the same pulse sequences as those of the transmitted pulses, but phase shifted by the pretrigger time tP.

The random generator 20 controls the divider circuit 19 which determines the divider ratio in relation to the transmitted pulses of the primary radar device which ratio is to be used for the transmission of the interrogation signals in the case of the secondary radar device. The construction of such random generators is known and in the simplest case it is possible to produce pseudostatisticaly-fluctuating numerical values, for example, using a counter or shift register, having a corresponding coder circuit.

The divider 19 produces a gate pulse Gj which is conducted to the trigger preparation stage 17. This gate pulse has a duration which is less than the period between the pretrigger pulses in line c) in FIG. 1. These gate pulses are represented in line d) for the interrogation station A and are referenced Gj10, Gj4, Gj6, Gj11, and Gj14. Thus, the trigger preparation state 17 functions as an AND gate which allows the relevant pretrigger pulse to pass whenever the gate pulses Gj10, Gj4, etc. are simultaneously present (e.g. P0 and Gj10; P4 and Gj4, and so on). The occurrence of the gate pulses Gj10, Gj4, and so on is established by the controllabledivider 19. This type of circuit has the advantage that any instabilities in the elements 20 and 19 do not affect the accuracy of the pretrigger generation or the accuracy of the blanking of the interrogation signals. This high degree of accuracy is of significance for the assignment of primary and secondary radar information during analysis.

The unblanked pretrigger pulses Ap0, AP4, AP6, AP11, AP14 shown in line d) actuate the coder 16 which in a known manner, and depending upon the interrogation mode being employed, forms a pulse train which is transmitted via the antenna 11 as coded interrogation signals. Thus, one interrogation signal corresponds to each of the thus unblanked pretrigger pulses.

The response signals pass from the decoder 22 to the adder 23. The lower right hand part of the arrangement shown in FIG. 3 represents the interference blanking circuit which serves to eliminate undesired (asynchronous) response signals. For each channel, the storer 24 contains at least one corresponding storage position e.g. in the form of at least one register position of a shift register. In this storage device are stored the number of response signals which have previously arrived in a specific range channel (e.g. R1 in line m) of FIG. 1) during previous responses. The input storage can be carried out with the use of weighing. If is is assumed that the response signals AA0 and AA4 have arrived in the range channel R1, the shift register which serves to count the response signals in the range channel R1 will be e.g. at the value 2. If, now, the (third) response signal AA6 arrives as a new response, during the opening of the range channel R1 the existing count of the shift register i.e. 2 is made available via the line 24a to the adder.

If the response AA6 now arrives within the scope of the range channel R1, the existing count of 2 is increased in the adder 23 e.g. to the new value of 3, and fed back to the storer 24 in which this new count is entered into the shift register for the range channel R1. This procedure is repeated once following each interrogation for each range channel so that each counter device is connected once to the adder 23. These processes are controlled via the control circuit 26 which receives from the circuit 17 the information as to when an interrogation signal has been transmitted and when, as a consequence, the acceptance gates AT0, AT4, and so on in line m) in FIG. 1 are open. The total display range is divided up into the individual range channels R1 to R3 and so on, usually with n range channels R1 to Rn, by means of the circuit 27 which produces the channel pulse trains. This circuit which is designed e.g. as a counter which counts the range channels with AT0 e.g. up to 3 and which serves to produce the channel pulse trains is also controlled by the circuit 17 which serves for trigger preparation. If no channel pulse train preparation is carried out in the secondary radar device, the store control unit 26 can be operated directly via the line 9 by the pulse central control 4.

The threshold in the threshold value stage 25 is set at a specific count (acceptance threshold) and when this threshold is reached, a display signal is forwarded over the line 10 to analysis circuit e.g. the screen 5 where it arrives at the correct time with the relevant primary radar echo signal and can be displayed or analyzed. It is possible to make the threshold value of the threshold value stage 25 adjustable. The quantity of the threshold value depends upon the operating conditions of the relevant secondary radar device. This situation is governed in particular by how many response signals can be triggered on the basis of the width of the antenna lobe and the rotational speed of the antenna 11 during the sweep over target. In the case of a very slowly rotating antenna with wide lobes numerous response signals may be expected so that the threshold value in stage 25 can be set to be high. In the case of rapidly rotating antennae with a small lobe this threshold value must be selected to be low. The evaluation of the response signals must be additionally considered when selecting the threshold value.

It is also possible to employ the same divider ratio several times in succession. This will not lead to errors so long as the number of successive identical divider ratios (possibly taking into account the evaluation) is lower than the number which governs the acceptable threshold, e.g. in FIG. 3 of the threshold value of the threshold 25.

The cost of the system may be kept low in secondary radar devices in which the elements 23 to 27 are already present e.g. for the evaluation of individual responses, because only elements 17, 19, and 20 need to be added.

Figure 4:
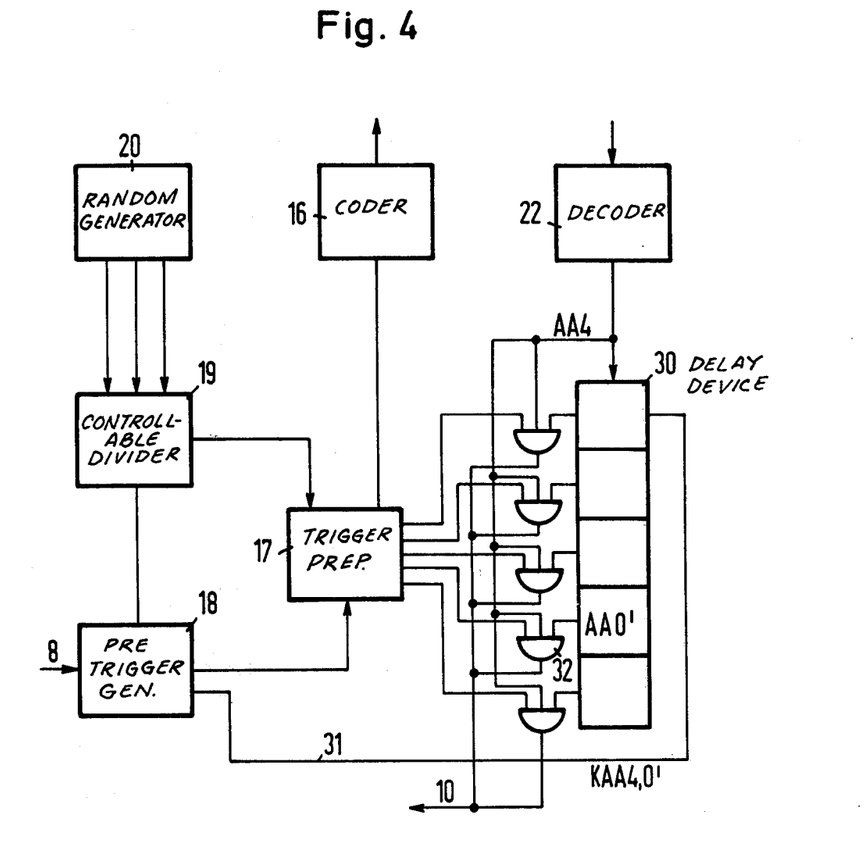
FIG. 4 is a block circuit diagram of a device for coincidence formation, with delay devices.

Instead of providing additional processing of the response signals in the form of range channels and the associated improved interference blanking, it is possible to employ delay circuits. Details of such an embodiment are shown in FIG. 4. The elements 8, 10, 20, 19, 18, 17, 16 and 22 are the same as the components bearing these same reference numerals in FIGS. 2 and 3. The difference of this embodiment from that shown in FIGS. 2 and 3 is in the lower right hand part of FIG. 3 i.e. the interference blanking circuit.

Response signals e.g. AA0 emitted by the decoder 22 are entered into delay device 30 e.g. which may have the form of a shift register. With each primary radar pulse train or each pretrigger pulse, the response signal e.g. AA0 is shifted one register stage by a control pulse having a period T from the line 31. When the next response signal arrives e.g. AA4, in the case of the fourth register stage it is coincidence with the response signal AA0' which is displaced by 4T. For this purpose an AND gate 32 is provided for each register stage, the number of register stages being equal to the maximum possible divider ratio, e.g. the AND gate 32 is provided for the fourth register stage. The correct AND gate obtains a pulse at a third input thereof from the trigger preparation stage 17. This is possible because the relevant divider ratio is present in the stage 17. Then the signal KAA4, 0' occurs at the output of the AND gate 32 as shown on line 1) of FIG. 1.

The response signal AA4 shown in line i) is delayed in the delay device 30 by 2T (because of the divider ratio is 1:2) and then the delayed signal AA4' coincides with the response signal AA6 at the AND gate of the third register stage. The response signal AA6 is delayed by 5T (divider ratio 1:5) and then, in the form of the delayed signal AA6' coincides with the response signal AA11 in the AND gate of the fifth register stage.

In this case it is unnecessary to provide range channels in the secondary radar device. Instead of the control by range channels only control by delay devices is required i.e. in dependence upon which divider ratio is selected by the divider 19, and it is necessary to operate a storage circuit, in the form of a pulsed shift register (with the pulse periodicity T) in accordance with the selected divider ratio.

Figure 5:
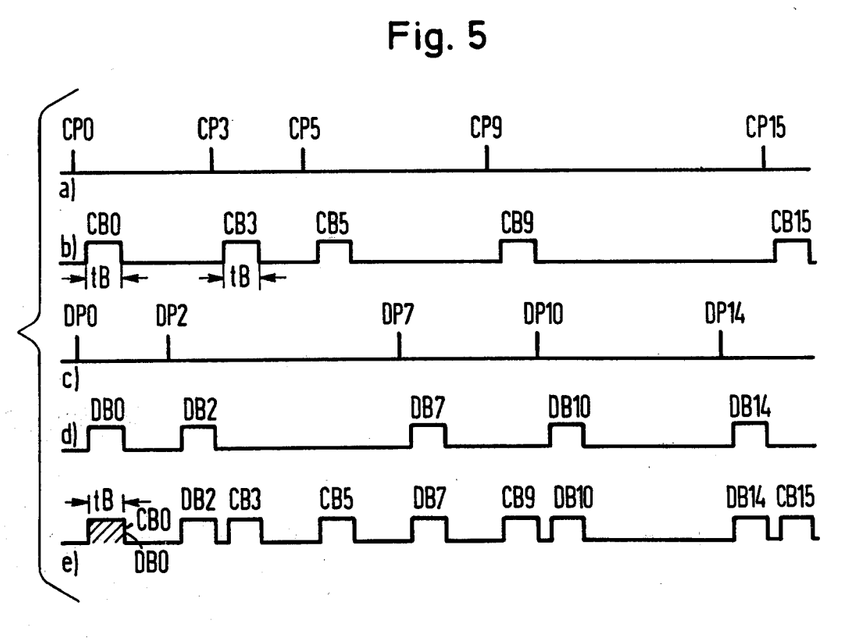
FIG. 5 is a pulse diagram showing the improvement achieved by means of the invention for blocking response devices.

FIG. 5 illustrates pulse trains which illuustrate the improvement that may be achieved by means of the invention so as to block the response devices (transponders) by the interrogation of a number of stations. Line a) in FIG. 5 shows individual interrogation pulses which are obtained by different divider ratios from primary radar transmitted pulses (not shown in detail). These interrogation signals are referenced CP0, CP3 (divider ratio 1:3), CP5 (divider ratio 1:2), CP9 (divider ratio 1:4), and CP15 (divider ratio 1:6).

Line b) in FIG. 5 shows the capture time tB for a response device (transponder) in which interrogation signals will be assumed to be arriving from a station C, as shown in line a). The capture time tB is dependent upon the system properties of the relevant interrogation response system. The more complex the composition of the interrogation signal and/or the response signal, the longer this time will be. During the capture time tB, the response device is clocked and cannot reply to other interrrogations. In line b) the capture times of the response device which relate to the interrogation signals in line a) are referenced CB0 (produced by CP0), CB3 (produced by CP3), CB5, CB9 and CB15. The capture times thus vary in the same way as the interrogation signals in line a).

If two interrogation stations having approximately the same interrogation frequency should interrogate one response device, it may be that this response device will answer interrogations from one station while the interrogation from the second station remains entirely unanswered. This will occur in particular when the interrogations of the second station always arrive at a time when the response device is engaged in interrogation by the first station.

Line c) in FIG. 5 represents the interrogation signals of a further station D and these signals are referenced DP0, DP2, DP7, DP10, and DP14. Different divider ratios from those of the station C have been selected as is clear from the indices of the interrogation signals.

Line d) of FIG. 5 shows the captured signals of the same response device as in line b), as a result of interrogation in accordance with line c) and these signals are referenced DB0, DB2, DB7, DB10, DB14, when the capture time DB0 relates to the interrogation signal DP0 and so on.

Line e) in FIG. 5 shows the capture times both in accordance with line b) (produced by the station C) and also in accordance with line d) (produced by the station D). It will be seen that, apart from the shaded first capture time CB0, DB0, there is no overlapping of capture times, so that the response device (transponder) will in practice respond to interrogations form both stations. The absence of a response due to the coincidence or closeness in time of two interrogations from the stations C and D is thus a random chance and represents an isolated case. This favorable feature of the invention is particularly advantageous when an area is heavily covered with interrogation stations.

Figure 6:
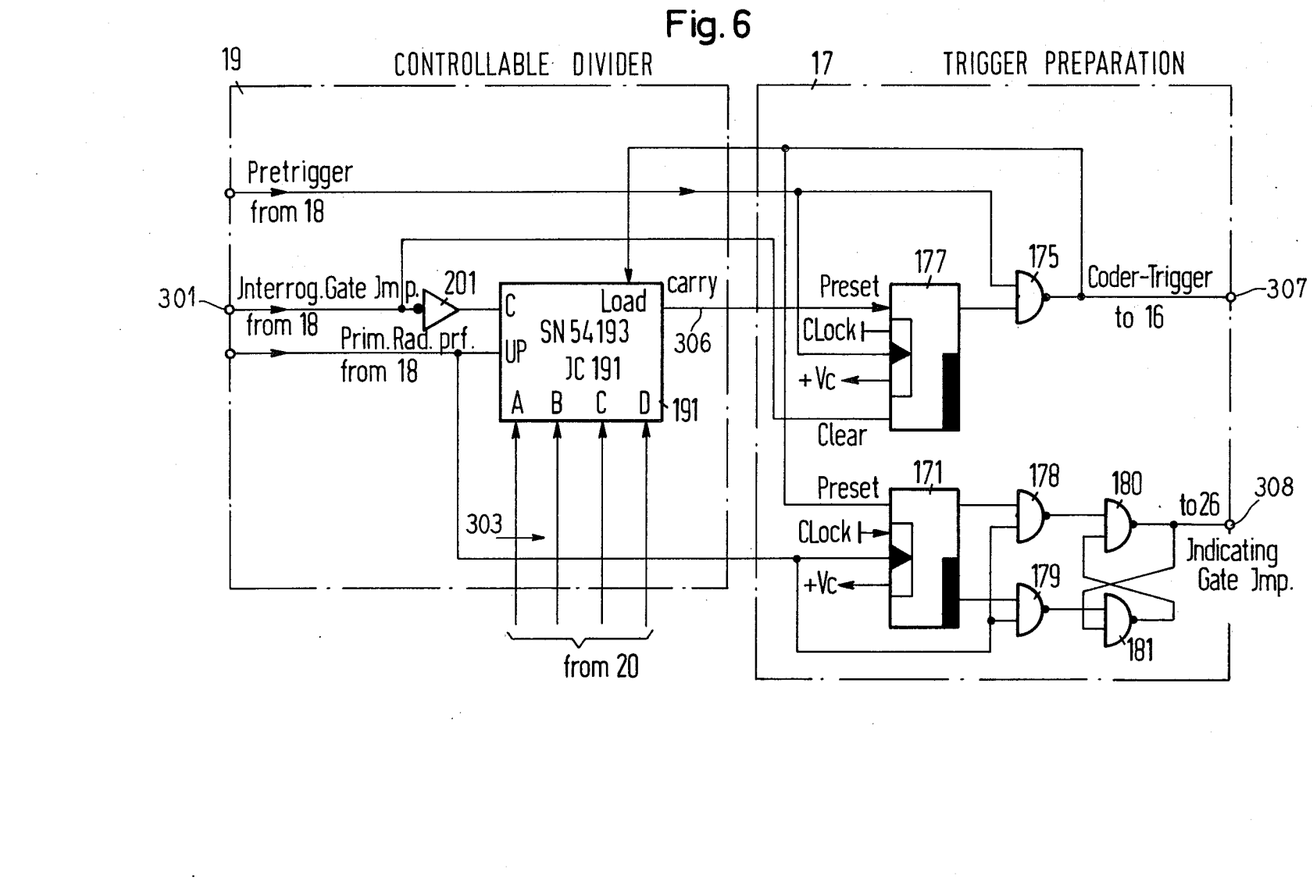
FIG. 6 is a block diagram illustrating the controllable divider and the trigger preparation circuits.

FIG. 6 illustrates the controllable divider 19 and the trigger preparation circuit 17 shown in FIGS. 3 and 4. Controllable divider 19 includes a preadjustable four bit advance-reverse counter JC 191 which is used only in advance function. This element forms the essential component of the frequency divider 19 with variable divider ratio and is similar to that illustrated in the prior art such as shown in British Pat. No. 1,151,505. When no interrogation signal is received the four bit counter 191 will be set back with a logical 1 at the clear input C through the inverter 201 from terminal 301 from the pretrigger generator 18. Thus, the four bit counter 191 will be preadjusted to 0.

In the event an interrogation order (interrogation gate is emitted by the pretrigger generator 18) the four bit counter is started and begins to count on the rear flank of the first primary impulse starting immediately after the beginning of the interrogation. The four bit counter 191 has a Carry output on lead 306 which is emitted only as the counting impulse arriving during a certain counting position (position 15). This impulse has the time position and the impulse width of, for instance, the sixteenth primary radar impulse since the counter 161 commenced to start from 0. This pulse is furnished to the trigger preparation circuit 17 on lead 306.

Figure 9:
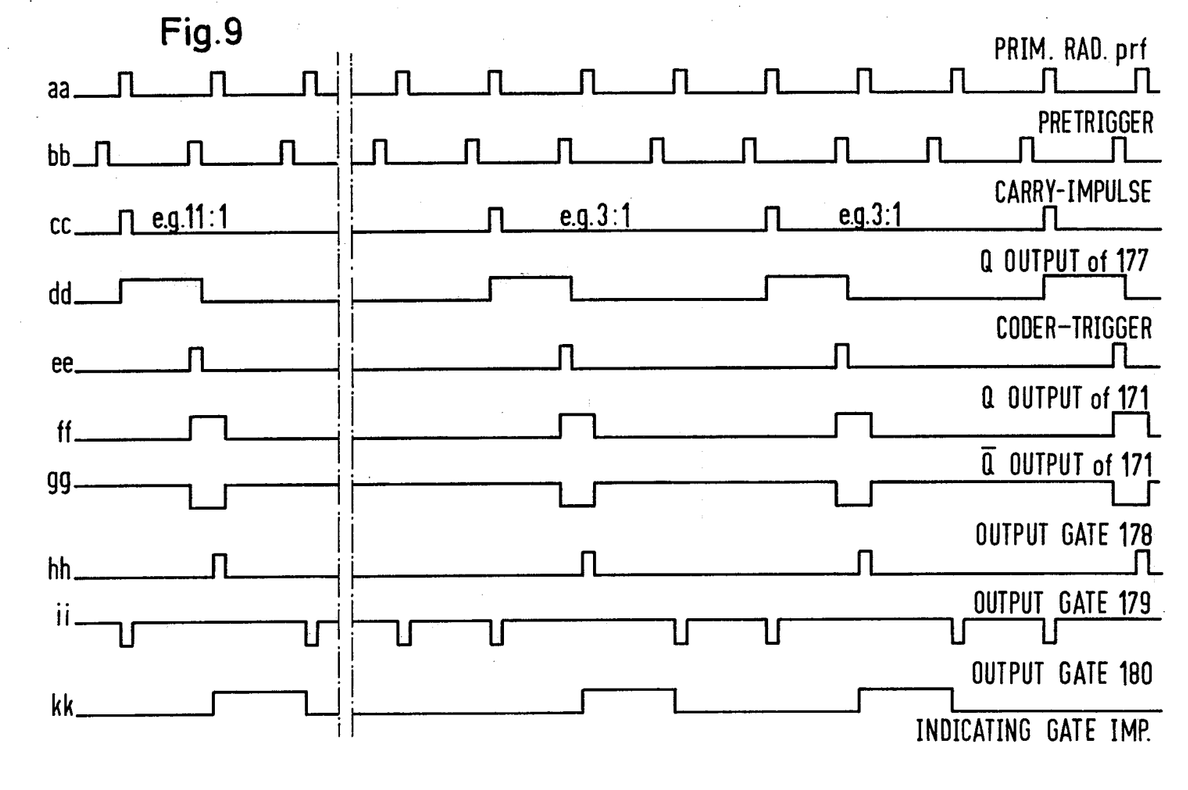
FIG. 9, is a pulse diagram for explaining the invention.

The trigger processing circuit 17 emits a code trigger at terminal 307 which is supplied to the coder 16 and which is shown in wave form ee in FIG. 9. The front flank of this code trigger causes the new number supplied by the random generator 20 on leads 303 to take control of the four bit counter 191. This is accomplished by triggering the load input of the counter 191. Thus, the process will be started over again with the next primary radar impulse but with a newly readjusted timing divider 19 adjusted, by way of example, to the number 11 which is supplied by the random generator 20. The respective divider ratio results from the relationship: 16 minus the number supplied by the random generator 20.

The trigger preparation device 17 includes a flip-flop 177 which is cleared when no interrogation gate is received, or in other words, the Q output is a logical 0.

If an interrogation gate is applied on lead 306 the previously described Carry impulse will appear (in accordance with the previously selected numerial example) with the sixteenth primary radar impulse and it will cause the flip-flop 177 to change to a logic 1 via the preset input on lead 306 and the output of the flip-flop 177 will block the gate 175 connected to the output of the flip-flop.

The pretrigger impulse succeeding the Carry impulse will now reach the output terminal 307 which is connected to the coder 16 through the release gate 175 as a coder trigger signal. The same pretrigger impulse furthermore will set the Q output of the flip-flop 177 to a logic 0 with its rear flank such that subsequent pretrigger impulses at gate 175 are blocked until a new Carry impulse arrives which changes the flip-flop 177 to the one position. Also, via the preset input the flip-flop 171 will be set back by the clock input by the rear flank of the succeeding primary radar impulse. The gate supplied by the flip-flop 171 at the Q output reaches the gate 178 at the output of the flip-flop 171 and will further process the primary radar impulse appearing at this gate toward the flip-flop formed of the two gates 181 and 180 and will set it. The Q output of the flip-flop 171 will block the primary radar impulses due to the action of the gate 179 whereby the primary radar impulse which had been passed through gate 178 will assure that only successive primary radar impulses will reset the flip-flop formed by the gaates 180 and 181. Thus, the indicating gate impulse will appear at the output of the gate 180 on terminal 308 which is supplied to control circuit 26 and this output determines the indicated range of the secondary radar system which is supplied to the memory control 26. FIG. 9 shows wave forms cc which comprise the Carry impulse. Wave form dd represents the output of flip-flop 177 on the Q output. Wave form ee is the signal at terminal 307 supplied to the coder trigger 16. The output ff comprises the Q output of flip-flop 171. Wave form gg represents the Q output of flip-flop 171. Wave form hh represents the output of gate 178. Wave form ii represents the output of gate 179. Wave form kk represents the output of gate 180 at terminal 308 which comprises the indicating gate impulse.

Figure 7:
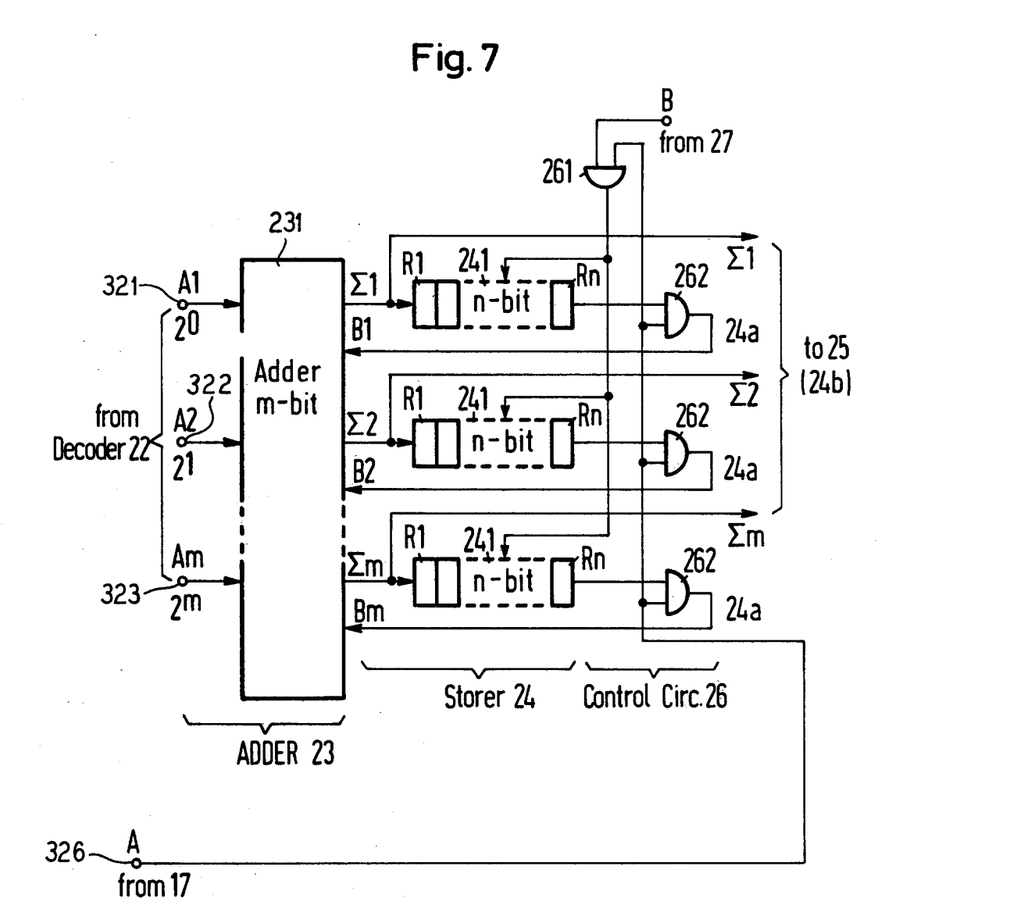
FIG. 7 is a block diagram illustrating the adder, storer and control circuit.

FIG. 7 is a block diagram illustrating the details of the adder 23, the storer 24 and the memory control circuit 26 illustrated in FIG. 3. The output signal of the decoder 22 is supplied to terminals 321 and 322 and 323 and the output signal of the decoder 22 can be represented by $m$ bits. Al input on terminal 321 corresponds to the value $2^0$ and the input Am on terminal 323 corresponds to the value $2^m$.

The adder 223 comprises an $m$ bit adder 231 which is connected to terminals 321, 322 and 323 and $m$ shift registers 241 a through $m$ are connected to the outputs of the adder 231 and each of the shift registers 241 include $n$ stages. The $n$ stages correspond to the number $n$ of distance channels R1 through $R_n$ of which only three (R1, R2, R3) are illustrated in FIGS. 1a and 1b as wave form m. The memory control circuit 26 receives the channel pulse train generator 27 output illustrated in wave form $r$ in FIG. 8 as shown in FIG. 3 and these pulses are supplied to the AND gate 261 which receives a second input from the trigger preparation circuit 17 on terminal 326. The trigger preparation device 17 emits a pulse of the wave-shape $q$ in FIG. 8 at the beginning of the particular radar cycle during which an interrogation is started (triggered) and it should be particularly remembered that the number of interrogation impulses is smaller than the impulse-repetition frequency (the pulse repetition frequency) of the primary radar device as it is shown in wave form $p$ in FIG. 8. The impulses illustrated in wave form g in FIG. 8 open the AND gate 261 and thus allow the pulses channel pulse train $r$ shown in FIG. 8 to pass during its duration TI illustrated in FIG. 8$q$. As $n$ switching impulses are required for $n$ distance channels all $n$ distance channels are made available during the interrogation time TI at the output of the shift registers 241 one after the other. If it be assumed that the value of the distance channel R1 has been stored out of the shift register 241 as the last value then this value will reach an AND gate 262 connected to the output of each shift register 241. As the AND gates 262 are connected with their second outputs to the terminal 326, these gates 262 are also opened when the impulse from Q shown in FIG. 8 appears during the time TI.

Figure 8:
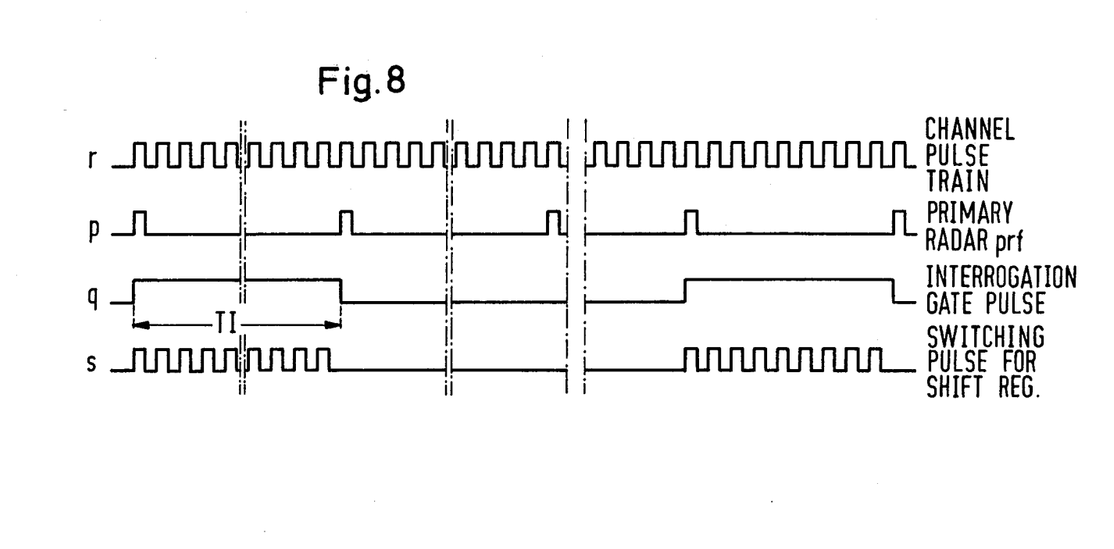
FIG. 8 is a pulse diagram for explaining the invention.

In FIG. 7 $m$ inputs Al through Am are supplied to the adding device 231. As an the wave form $q$ in FIG. 8 is simultaneously supplied via the second input of the AND gate 262, the m values of the distance channel R1 will be supplied to the adder 231 via the further inputs B1 through $b_m$. In the adder 231, the new values of A1 through $A_m$ of the distance channel R1 from the decoder 22 will be given at this instant and are combined with the old values B1 through $B_m$ again to obtain a new value E$i$ through E$m$ and are again furnished to the shift registers 241. In this manner, the information of the distant channel is positioned R1 in the first register stage of the shift register 241. The information of the distance channel R2 is positioned in the second stage of the shift register and in the information of the distance channel R$n$ is positioned in the last shift register stage. The new values E$i$ through E$m$ are further processed and supplied to the threshold circuit 25 from terminal 24$b$ in FIG. 3 for evaluation.

Although the invention has been described with respect to preferred embodiments, it is not to be so limited as changes and modifications may be made which are within the full intended scope as defined by the appended claims.

I claim as my invention:

1. A secondary radar device in which the interrogation pulse repetition rate is derived from the pulse repetition rate of a primary radar device comprising a variable controllable frequency divider a pulse generator supplying pulse repetition rate pulses to said primary radar and to said variable frequency divider, a random generator also connected to said variable frequency divider, a trigger preparation device connected to the output of said variable frequency divider so that the interrogation pulse repetition frequency of the secondary radar for the interrogation signal changes continuously with the divider ratio, a memory control circuit, said trigger preparation circuit connected to key said secondary radar transmitter and emitting an indicator impulse to said memory control when an interrogation signal is transmitted, a storer connected to said memory control and storing information, an adder connected to said storer, a decoder connected to the receiver of said secondary radar and supplying to said adder the decoded answer signals, said storer under the control of said memory control and storing decoded answer signals from said adder in synchronism with the timing of the interrogation signals triggered by the trigger preparation circuit so that nonsynchronous answer signals are suppressed and that synchronous ones are admitted, and a threshold circuit connected to said storer, a presentation means connected to said threshold circuit and receiving an output signal from said storer only when a threshold value is exceeded by the stored answer signals.

2. A device as claimed in claim 1, including additional secondary radar devices with the random generators of said additional secondary radar devices producing different output signals controlling continuously different divider ratios of the frequency dividers of all secondary radars and all said secondary radar devices having continuously different pulse repetition frequencies.

3. A device as claimed in claim 2 wherein the range of variation of the divider ratios of the frequency dividers of all said secondary radar devices, which are varied by said random generators, is the same for all of said secondary radar devices.

4. A device as claimed in claim 1 including a delay circuit arranged to delay answer signals delivered from the output of the decoder by a multiple of the period of the primary radar device pulses, which multiple coincides with the divider ratio for the next following interrogation signal; a coincidence circuit, said coincidence circuit being connected to the output of said delay circuit and to the output of the decoder, the output signal of said coincidence circuit being delivered to said presentation means indicating a synchronous answer signal.

5. A random pulse repetition radar apparatus comprising, means for generating a pulse train of equally spaced interrogation pulses, random pulse transmitting means connected to said pulse train generator, a transmitter connected to said random pulse transmitting means and transmitting pulses on a random basis, receiving means associated with said pulse transmitting means and receiving answer pulses, storage means connected to said receiving means and receiving said answer pulses, therefrom, and output means connected to said storage means and to said random pulse transmitting means and actuated only when said answer pulses have been received for a plurality of consecutive times after said selected interrogation pulses have been transmitted.

* * * * *